United States Patent
Chaudhari et al.

(10) Patent No.: US 8,856,081 B1
(45) Date of Patent: Oct. 7, 2014

(54) SINGLE RETENTION POLICY

(75) Inventors: Sachin B. Chaudhari, Oakland, CA (US); Viktor Gavrysh, Richmond Hill, CA (US)

(73) Assignee: EMC Corporation, Hopkinton, MA (US)

( * ) Notice: Subject to any disclaimer, the term of this patent is extended or adjusted under 35 U.S.C. 154(b) by 430 days.

(21) Appl. No.: 12/494,645

(22) Filed: Jun. 30, 2009

(51) Int. Cl.
*G06F 17/30* (2006.01)
*G06F 15/16* (2006.01)

(52) U.S. Cl.
USPC .......................................... 707/661; 707/665

(58) Field of Classification Search
USPC .......................................... 707/662, 665, 661
See application file for complete search history.

(56) References Cited

U.S. PATENT DOCUMENTS

| | | | | |
|---|---|---|---|---|
| 2003/0225801 | A1* | 12/2003 | Devarakonda et al. | 707/205 |
| 2006/0075007 | A1* | 4/2006 | Anderson et al. | 707/206 |
| 2006/0282629 | A1* | 12/2006 | Stuart et al. | 711/159 |
| 2008/0059448 | A1* | 3/2008 | Chang et al. | 707/5 |
| 2008/0109448 | A1* | 5/2008 | Aboel-Nil et al. | 707/10 |

* cited by examiner

*Primary Examiner* — Alex Gofman
(74) *Attorney, Agent, or Firm* — Dergosits & Noah LLP; Todd A. Noah

(57) ABSTRACT

The invention provides instructions to a retention-base archiving application or other enterprise content management application (such as EMC Documentum) for identifying which data objects should share the same retention policy based upon content and context, even if the retention policies for each data object was originally selected by different archiving applications. By matching together data objects with the same retention interval, and/or matching together data objects with the same policy name (i.e., policy ID), a single retention policy can be assigned to related data objects, no matter the source of each related data object or which application selected the particular retention policy for each data object.

24 Claims, 2 Drawing Sheets

SINGLE RETENTION POLICY

FIELD

The invention relates generally to data archival and retention, and specifically, to implementing retention policies for related data objects.

BACKGROUND

Retention-based archiving applications are used to ensure compliance with certain legal obligations. A retention-based archiving application or similar program is typically installed on a client or server for the purpose of identifying the appropriate retention policy for data objects stored on the client or server. The specific archive and/or retention policy for a data object may differ depending upon the content or other attributes for the object. Software for an enterprise resource planning (ERP) system, a retention-based archiving application, or similar applications may be responsible for determining the appropriate retention policy for a data object. Once a retention policy has been determined for an object, the information about that policy may be stored in metadata associated with the object. This retention information may include metadata describing how long to retain the object in archive storage, i.e., the retention interval for that object. The retention information is then sent along with the data object to the archive store, which enforces a retention policy based upon the retention information.

Retention policy information is usually specific for the system that assigned the policy. For example, one ERP may determine the appropriate retention policy for one document in a group of documents, whereas another retention-based archiving application may determine a a retention policy for another document in the group. Both the ERP and the retention-based archiving application may in fact have determined retention policies with the same retention interval, but because the respective retention policies were assigned by different systems, the retention information metadata will differ. This creates redundancy and maintenance problems for the archive store.

In another example, when a financial document is archived and stored in an archive store, it will be assigned a retention policy by an ERP, which will determine the retention interval and disposing method. However, the repository may already store other files related to the archived document, such as scanned originals. These related files may have been assigned separate retention policies, which may or may not be consistent with the retention policy assigned to the financial document. What is therefore needed is a way to reconcile the different retention policies for related documents.

BRIEF DESCRIPTION OF THE FIGURES

The invention is illustrated by way of example and not limitation in the figures of the accompanying drawings, in which like references indicate similar elements, and in which.

DETAILED DESCRIPTION

The invention is a system and method for implementing a single retention policy for related data objects, regardless of the system or application that may have previously determined and/or assigned a retention policy or policies to the related objects. The invention ensures that related objects are subject to the same retention interval.

It should be appreciated that the invention can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In the context of this document, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to as components or modules. Applications may be hardwired or hard coded in hardware or take the form of software executing on a general purpose computer such that when the software is loaded into and/or executed by the computer, the computer becomes an apparatus for practicing the invention. Applications may also be downloaded in whole or in part through the use of a software development kit or toolkit that enables the creation and implementation of the invention. In this specification, these implementations, or any other form that the invention may take, may be referred to as techniques. In general, the order of the steps of disclosed processes may be altered within the scope of the invention.

Figure 1:
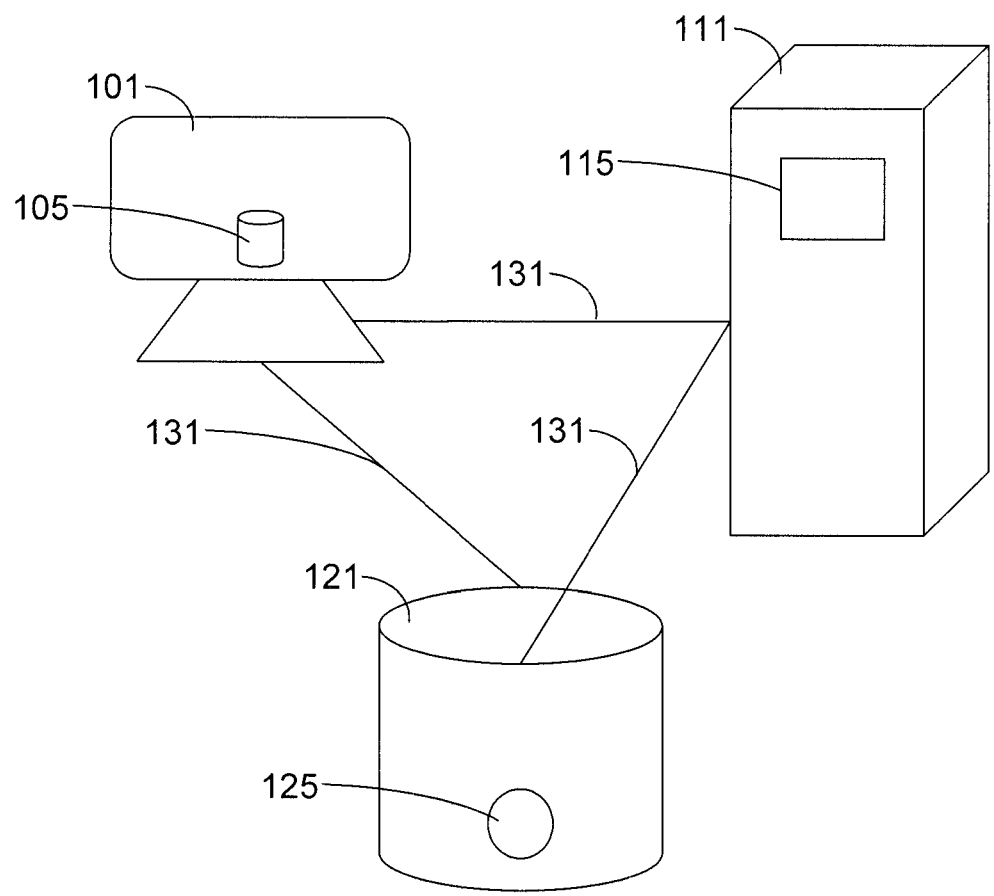
FIG. 1 is an exemplary block diagram depicting one embodiment of the invention.

FIG. 1 is a block diagram illustrating an embodiment of a system for implementing a single retention policy. In the example shown, client computer or workstation 101 is coupled to server 111 and archive store 121 over a network 131. Network 131 may be a local network, a wide area network (WAN), the Internet, a wired network, a wireless network, or a direct connection. Client computer 101 and server 111 may each store data objects for archiving. On client computer 101, identification of data objects for archiving may be performed by a retention-based archiving application 105, which may also be a client computer version of a ERP system. Similarly, on server 111, a retention-based archiving application 115 or ERP may be responsible for identifying which data objects should be archived from server 111. Moreover, the example below will describe an embodiment in which the server 111 and the client computer 101 both utilize a retention-based archiving application rather than an ERP. One skilled in the art, however, will appreciate that the server 111 and client computer 101 can both utilize an ERP, or that one may use a retention-based archiving application and the other may use an ERP. The retention-based archiving application 105 on client computer 101 may not be the same as the retention-based archiving application 115 on server 111. In an embodiment, even if these applications differ, both application 105 and application 115 may identify data objects for archiving and may calculate and associate metadata with each respective data object. This metadata may describe the appropriate retention policy for the associated data object.

The system may also include an archive store 121. Data objects from client computer 101 or server 111 may be sent to archive store 121 for storage. In an embodiment, archive store 121 communicates with retention-based archiving application 105 or retention-based archiving 115 using an archive connector software layer 125. The connector layer 125 may be responsible for receiving data objects for archiving, and sending the data objects to a repository by calling the archive store 121 API. In this embodiment, the connector layer communicates directly with the retention-based archiving application. The archive store 121 may also assign retention policies directly through a retention-based archiving application with the use of archive connector software layer 125.

Figure 2:
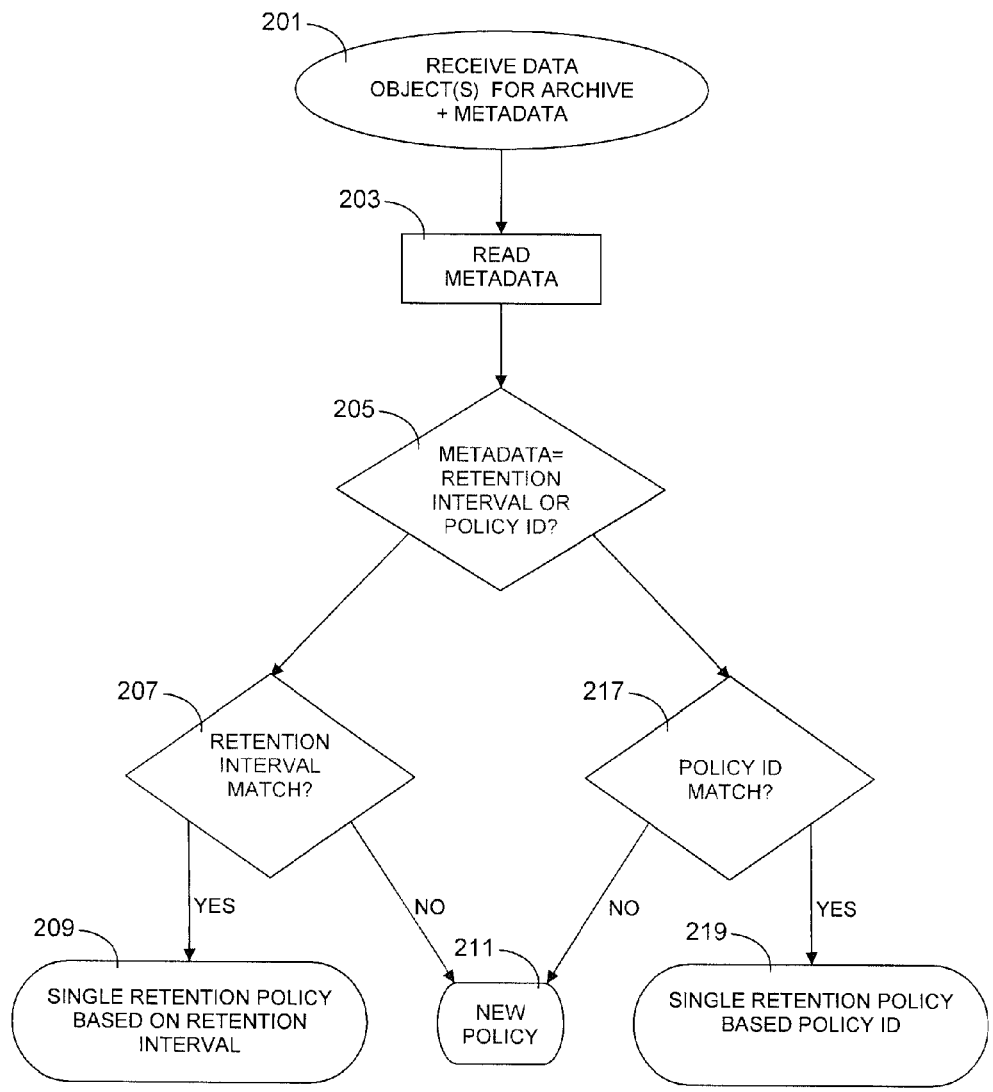
FIG. 2 is an exemplary flow diagram illustrating the steps of an embodiment of the invention.

FIG. 2 is a flow diagram illustrating an embodiment of a method for implementing a single retention policy for data objects stored in an archive store. One will appreciate that even though the following example refers to a single archive store, the method embodiment will work with related data objects stored in different locations as well.

One will appreciate that during the archive process, each archived data object is typically associated with retention information metadata. This metadata may include the following types of information about the data object: (1) content attributes, e.g., whether the object is a MS Word document, an Adobe PDF file or a binary image; (2) business-related attributes, i.e., the object's name, creation/modification date, author, etc.; or (3) retention-related attributes, i.e., a retention policy identifier (policy ID), retention interval, name of the applicable legal policy or hold on the object, disposal method, etc. Some or all of these types of metadata is sent with the data object to the archive store during archival. The archive store uses this information to enforce the retention policy for the prescribed retention interval. However, the invention can make use of this metadata in order to match related objects and assign a single retention policy.

In an embodiment, the following method is performed by the archive store 121. However, one will appreciate that a software layer, or archiving connector layer 125 on archive store 121 may perform the following method. As discussed previously, the connector layer 125 may be responsible for receiving data objects for archiving, and sending the data objects to a repository by calling the archive store API. In an embodiment, the archive store 121 may be acting through a retention-based archiving application that may also be responsible for assigning retention policies. In an embodiment, the retention-based archiving application may communicate with an archiving connector layer 125 in order to perform the method of FIG. 2.

In 201 of FIG. 2, at least two data objects are received by the archive store 121, each data object associated with metadata assigned or calculated by a respective retention-based archiving application. In other words, each data object will have retention information assigned prior to archival, but the respective retention policy appropriate for this retention information has not been attached or enforced. The archive store 121 will perform the function of attaching the appropriate retention policy for each data object.

In 203 of FIG. 2, the archive store 121 reads the respective metadata associated with each data object. In 205 of FIG. 2, the archive store 121 determines whether the metadata for each respective data object contains retention interval information, or whether the metadata for each respective data object contains a policy ID. If both the respective metadata for both objects contain retention interval information, then in 207 of FIG. 2, the archive store 121 determines whether the retention interval information for each data object matches. This may require querying the policies already being enforced by the archive store 121, and seeing if any of these existing policies have the same retention interval information for each data object. If so, then in 209 of FIG. 2, the archive store 121 will assign a single retention policy with the same retention interval to the two data objects. If the retention interval information for each data object do not match, then in 211 of FIG. 2, the archive store 121 will attach a new retention policy appropriate for each object based upon their respective retention interval information.

If in 205 of FIG. 2, the archive store determines that the metadata for each respective data object contains a policy ID instead of retention interval information, then in 217 of FIG. 2, the archive store 121 determines whether the policy ID for both data objects matches an existing retention policy. This may require querying the policies already being enforced by the archive store, and determining whether any of these existing policies has the same policy ID as the two data objects. If an existing retention policy matches the policy ID for both data objects, then in 219 of FIG. 2, the archive store 121 will assign that retention policy to the two data objects. If the archive store cannot locate a matching retention policy for the data objects' policy IDs, then in 211 of FIG. 2, the archive store 121 will attach a new retention policy appropriate for each object based upon their respective metadata. One will appreciate that if the metadata for one of the data objects contains a policy ID matching an existing retention policy, then that data object will be assigned the existing retention policy, even if the policy ID for the other data object does not match any existing retention policy. For the non-matching data object, the archive store 121 may assign a new retention policy appropriate for the non-matching data object.

One skilled in the art will appreciate that the method described above is merely exemplary, and that variations are possible. For example, the archive store 121 may be configured to only match retention interval information as illustrated in 207-211 in FIG. 2. This configuration may ignore policy IDs for data objects. Similarly, the archive store 121 may be configured to only match policy IDs and ignore retention intervals. In an embodiment, the metadata for data objects may contain both retention interval information and policy IDs. In this embodiment, the archive store 121 may be configured to only match retention interval information or only match policy IDs. Deciding which configuration to use may be set by an administrator, or may be a default setting of the archive store 121. In an embodiment, the archive store 121 may be configured to match other metadata instead of retention interval information or policy IDs. For example, the archive store may be configured to assign a single retention policy based upon matching content or business-related attributes, or a combination of content, business-related and/or retention-related attributes. The method described herein contemplates matching any common metadata for archived objects in order to assign and enforce a single retention policy for matched objects.

In an embodiment, the method of FIG. 2 may be performed upon the receipt of a single data object. In this embodiment, the archive store 121 will already manage one or more retention policies. In 201 of FIG. 2, the archive store 121 may receive a single data object with associated metadata. In 203 of FIG. 2, the archive store reads the metadata. In 205 of FIG. 2, the archive store 121 determines whether the data object's metadata includes retention interval information or policy ID information. If the data object's metadata includes retention interval information, then in 207 of FIG. 2, the archive store 121 will match this retention interval information with any of the retention policies it is already managing. This may require querying the policies already being enforced by the archive store 121, and determining whether any of these existing policies has the same retention interval as the received data object. If the retention interval information of the data object's metadata matches the retention interval information for a policy that the archive store is already managing, then in 209 of FIG. 2, the archive store 121 will assign the matching retention policy to the data object. However, if the archive store 121 cannot locate a matching retention policy, then it may assign a new policy in 211 of FIG. 2. The new policy may be based upon information from the data object's metadata.

If in 205 of FIG. 2, the data object's metadata contains a policy ID, then in 217 of FIG. 2, the archive store 121 will attempt to match the metadata policy ID with any of the retention policies that the archive store 121 is already managing. This may require querying the policies already being enforced by the archive store 121, and determining whether any of these existing policies has the same policy ID as the received data object. If there is a matching retention policy, then in 217 of FIG. 2, the archive store 121 will assign the matching retention policy to the data object. If there is no matching retention policy, then in 219 of FIG. 2, the archive store 121 will assign a new policy based upon the data object's metadata. One will appreciate that some metadata may include both retention interval information and policy ID information. In such situations, the archive store 121 may be configured to match retention interval information, rather than policy ID information, or vice-versa. In an embodiment, the archive store 121 may first attempt to match retention interval information, and if unsuccessful, then may attempt to match policy ID information.

One will appreciate that in the description above and throughout, numerous specific details are set forth in order to provide a thorough understanding of the invention. It will be evident, however, to one of ordinary skill in the art, that the invention may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of the invention. One will appreciate that these steps are merely exemplary and are not meant to be limiting in any way. Other steps and functions may be contemplated without departing from this disclosure or the scope of the invention.

What is claimed is:

1. A method for retaining a plurality of data objects, comprising:
   receiving, by an archive store, a first data object having associated metadata that includes retention information for the first data object;
   receiving, by the archive store, a second data object having associated metadata that includes retention information for the second data object;
   comparing, by the archive store, the retention information of the first data object with the retention information of the second data object;
   determining if the retention information of the first data object and the retention information of the second data object match any existing retention policies;
   assigning, by the archive store in response to the comparing the retention information step, a single retention policy with both the first data object and the second data object if the retention information of the first data object matches the retention information of the second data object; and
   creating, by the archive store in response to the comparing the retention information step, a first new retention policy for the first data object and a second new retention policy for the second data object, each of the first new retention policy and the second new retention policy incorporating respective retention information, and assigning the first new retention policy with the first data object and the second new retention policy with the second data object, when the retention information of the first data object does not match the retention information of the second data object and when neither the retention information of the first data object nor the retention information of the second data object match any existing retention policies.

2. The method of claim 1, wherein the retention information includes a retention interval.

3. The method of claim 1, wherein the retention information includes a retention policy identifier (policy ID).

4. The method of claim 1, wherein the archive store performs the method of claim 1 using an archiving connector layer.

5. The method of claim 1, wherein the first data object's retention information or the second data object's retention information is provided by a retention-based archiving application.

6. The method of claim 1, wherein the first data object's retention information or the second data object's retention information is provided by software for an enterprise resource planning (ERP) system.

7. A computer program product, comprising a non-transitory computer usable medium having a computer readable program code embodied therein to be executed by one or more processors, the program code including instructions to:
   receive, by an archive store, a first data object having associated metadata that includes retention information for the first data object;
   receive, by the archive store, a second data object having associated metadata that includes retention information for the second data object;
   compare, by the archive store, the retention information of the first data object with the retention information of the second data object;
   determine if the retention information of the first data object and the retention information of the second data object match any existing retention policies;
   assign, by the archive store in response to the comparing the retention information step, a single retention policy with both the first data object and the second data object if the retention information of the first data object matches the retention information of the second data object; and
   create, by the archive store in response to the comparing the retention information step, a first new retention policy for the first data object and a second new retention policy for the second data object, each of the first new retention policy and the second new retention policy incorporating respective retention information, and assign the first new retention policy with the first data object and the second new retention policy with the second data object when the retention information of the first data object does not match the retention information of the second data object and when neither the retention information of the first data object nor the retention information of the second data object match any existing retention policies.

8. The computer program product of claim 7, wherein the retention information includes a retention interval.

9. The computer program product of claim 7, wherein the retention information includes a retention policy ID.

10. The computer program product of claim 7, wherein the computer program product is run by an archiving connector layer on the archive store.

11. The computer program product of claim 7, wherein the first data object's retention information or the second data object's retention information is provided by a retention-based archiving application.

12. The computer program product of claim 7, wherein the first data object's retention information or the second data object's retention information is provided by software for an ERP.

13. A method for retaining a plurality of data objects, comprising:
receiving, by an archive store, a first data object having associated metadata that includes retention information for the first data object;
receiving, by the archive store, a second data object having associated metadata that includes retention information for the second data object;
comparing, by the archive store, the retention information of the first data object with the retention information of the second data object;
determining if the retention information of the first data object and the retention information of the second data object match any existing retention policies;
when the retention information of the first data object matches the retention information of the second data object:
assigning, by the archive store in response to the comparing the retention information step, a single retention policy with both the first data object and the second data object if the retention information of the first data object matches the retention information of the second data object, and
when the retention information of the first data object does not match the retention information of the second data object:
creating, by the archive store in response to the comparing the retention information step, a first new retention policy for the first data object, and assigning the first new retention policy to the first data object when the retention information of the first data object does not match any existing retention policy,
creating, by the archive store in response to the comparing the retention information step, a second new retention policy for the second data object, and assigning the second new retention policy to the second data object when the retention information of the second data object match does not match any existing retention policy, and
assigning, by the archive store in response to the comparing the retention information step, an existing retention policy to one of the first or second data objects when the one of the first or second data objects has retention information matching the existing retention policy.

14. The method of claim 13, wherein the retention information includes a retention interval.

15. The method of claim 13, wherein the retention information includes a retention policy ID.

16. The method of claim 13, wherein the archive store performs the method of claim 1 using an archiving connector layer.

17. The method of claim 13, wherein the data object's retention information is provided by a retention-based archive application.

18. The method of claim 13, wherein the data object's retention information is provided by is software for an ERP.

19. A computer program product, comprising a non-transitory computer usable medium having a computer readable program code embodied therein to be executed by one or more processors, the program code including instructions to:
receive, by an archive store, a first data object having associated metadata that includes retention information for the first data object;
receive, by the archive store, a second data object having associated metadata that includes retention information for the second data object;
compare, by the archive store, the retention information of the first data object with the retention information of the second data object;
determine if the retention information of the first data object and the retention information of the second data object match any existing retention policies;
when the retention information of the first data object matches the retention information of the second data object:
assign, by the archive store in response to the comparing the retention information step, a single retention policy with both the first data object and the second data object if the retention information of the first data object matches the retention information of the second data object, and
when the retention information of the first data object does not match the retention information of the second data object:
create, by the archive store in response to the comparing the retention information step, a first new retention policy for the first data object, and assigning the first new retention policy to the first data object when the retention information of the first data object does not match any existing retention policy,
create, by the archive store in response to the comparing the retention information step, a second new retention policy for the second data object, and assigning the second new retention policy to the second data object when the retention information of the second data object match does not match any existing retention policy, and
assign, by the archive store in response to the comparing the retention information step, an existing retention policy to one of the first or second data objects when the one of the first or second data objects has retention information matching the existing retention policy.

20. The computer program product of claim 19, wherein the retention information includes a retention interval.

21. The computer program product of claim 19, wherein the retention information includes a retention policy ID.

22. The computer program product of claim 19, wherein the computer program product is run by an archiving connector layer on the archive store.

23. The computer program product of claim 19, wherein the data object's retention information is provided by a retention-based archive application.

24. The computer program product of claim 19, wherein the data object's retention information is provided by is software for an ERP.

\* \* \* \* \*